(No Model.)
C. C. CARTER.
HAND HAY RAKE.
No. 323,787.                   Patented Aug. 4, 1885.
FIG. I.
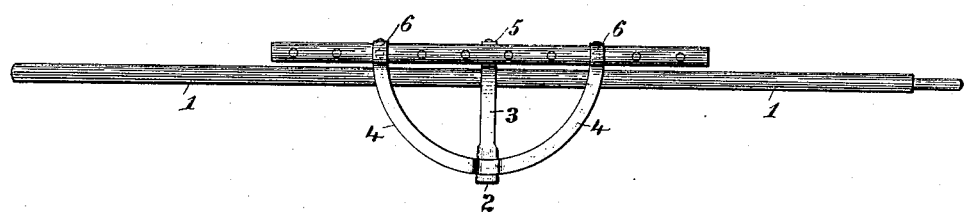
FIG. II.
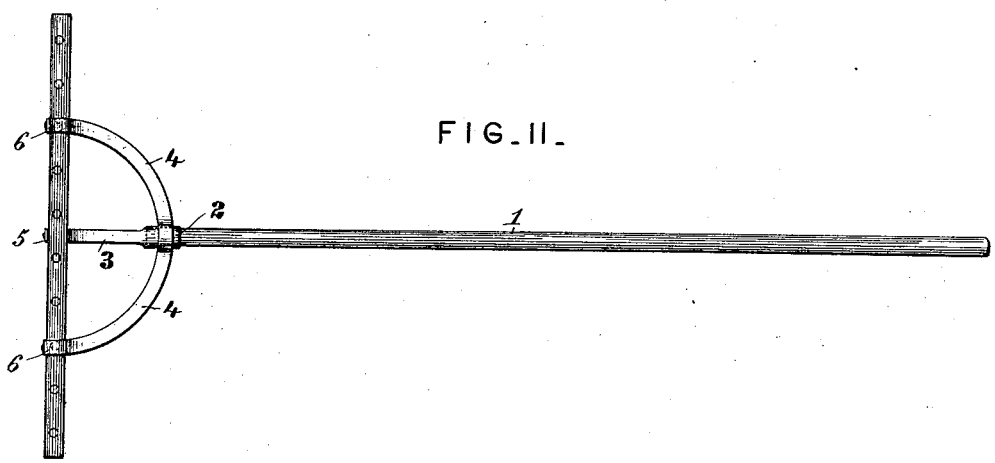
FIG. III.
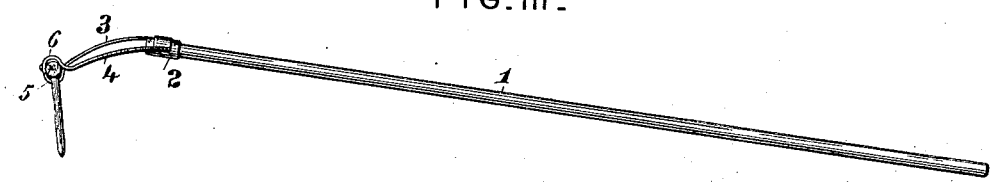
FIG. IV.
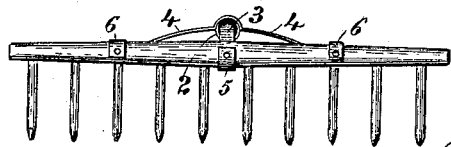
Attest:
Geo. T. Smallwood.
L. W. Hopkins
Inventor:
Charles C. Carter.
By Knight Bros.
Attys.
N. PETERS. Photo-Lithographer, Washington, D. C.

UNITED STATES PATENT OFFICE.

CHARLES C. CARTER, OF BURTON, OHIO.

HAND HAY-RAKE.

SPECIFICATION forming part of Letters Patent No. 323,787, dated August 4, 1885.

Application filed December 15, 1884. (No model.)

*To all whom it may concern:*

Be it known that I, CHARLES C. CARTER, a citizen of the United States, residing at Burton, in the county of Geauga and State of Ohio, have invented a new and useful Improvement in Wooden Hand Hay-Rakes, of which the following is a specification.

The object of the present invention is to provide a knockdown wooden hand-rake which is capable of being readily taken apart for shipment, while when put together it will possess strength superior to that of the ordinary rake whose parts are rigid. To this end I connect the wooden handle to its head by means of a wrought or malleable iron frame formed with a bow, a central socket or ferrule, in which the end of the handle is fastened when the rake is put together, hooks on the ends of the bow to grasp the head from one side, and an arm extending from the ferrule, and having a hook to grasp the head from the opposite side. The rake-head is preferably made circular or elliptical in cross-section, with its central portion tapered down to its ends, so as to afford great strength, while not unnecessarily increasing the weight.

In order that my invention may be more fully understood, I will proceed to describe it with reference to the accompanying drawings, in which—

Figure I is a view of the rake when taken apart for shipment. Fig. II is a plan view showing the rake put together. Fig. III is a side elevation of the same. Fig. IV is a rear elevation of the head.

The wooden handle 1 is made with a slightly-tapered end, adapted to occupy a metallic socket, 2, which has at one end a wrought-iron arm, 3, formed with a hook, 5, fixed to the middle of the rake-head, and bowed in such manner as to give the proper inclination to said head when the rake is in use. Parting from each side of the socket or ferrule is an arm or bow, 4, whose ends are also bent over to form hooks 6, and nailed to the rake-head at equal distances from the central arm 3, so as to properly brace the handle and rake-head together. It will be seen that with an arrangement such as here shown neither the handle nor the head is weakened by having perforations adapted to the fastening of the parts together.

When it is desired to ship the rake, the parts are separated so as to occupy a small compass, as shown in Fig. I, and when they have reached their destination they are readily put together, as shown in Fig. II, and fastened by nails or other means driven through the ferrule into the handle and through the hooks into the rake-head.

The head is made, as shown in Fig. IV, of considerable depth at its center and tapering therefrom to each end, the center of the rake being approximately elliptical in cross-section, with its major axis vertical, while the ends are approximately circular, with a diameter approximately equal to the minor axis of the said ellipse. It will be seen that by such a construction of head the strength and lightness of the rake are increased, while facility of detachment of the hooks from the handle is not impaired.

I do not claim, broadly, a rake-head and a rake-handle braced together by a metallic frame, as I am aware that such frames are old and well known.

Having thus described my invention, the following is what I claim as new therein and desire to secure by Letters Patent:

1. In a wooden hand hay-rake, the metallic frame formed with a bow, 4, a central socket or ferrule, 2, to receive the end of the handle, hooks 6 on the ends of the bow, and an arm, 3, extending from the ferrule and having a hook, 5.

2. In a wooden hand hay-rake, the combination, with the head and handle, of the metallic frame formed with bow 4, ferrule 2, bow-hooks 6, arm 3, and arm-hook 5.

CHARLES C. CARTER.

Witnesses:
  W. S. METCALFE,
  C. F. BURLEIGH.